United States Patent Office 3,233,956
Patented Feb. 8, 1966

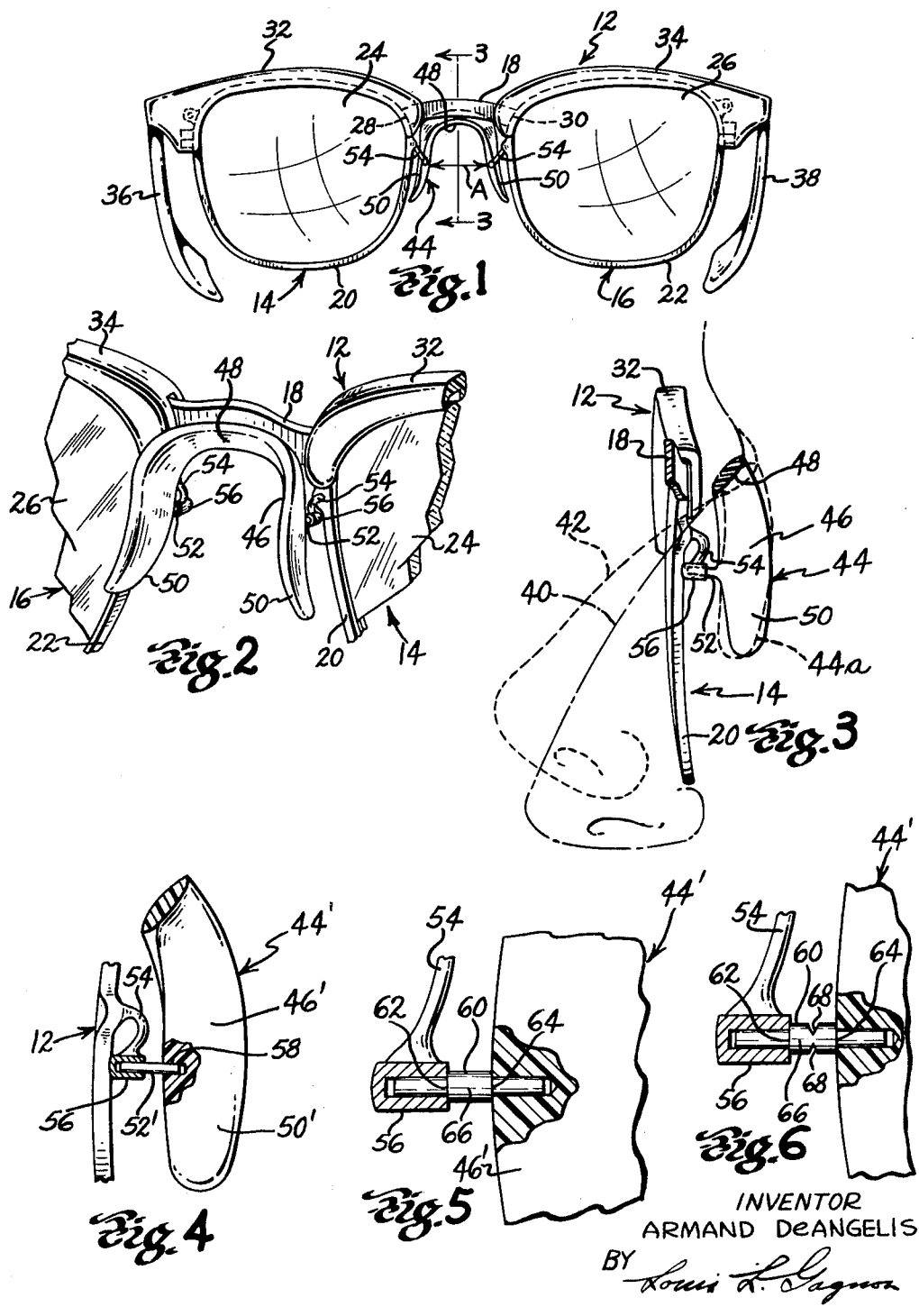

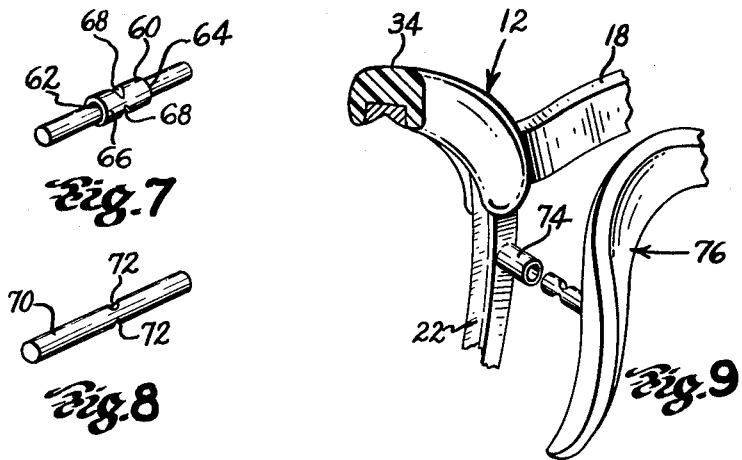
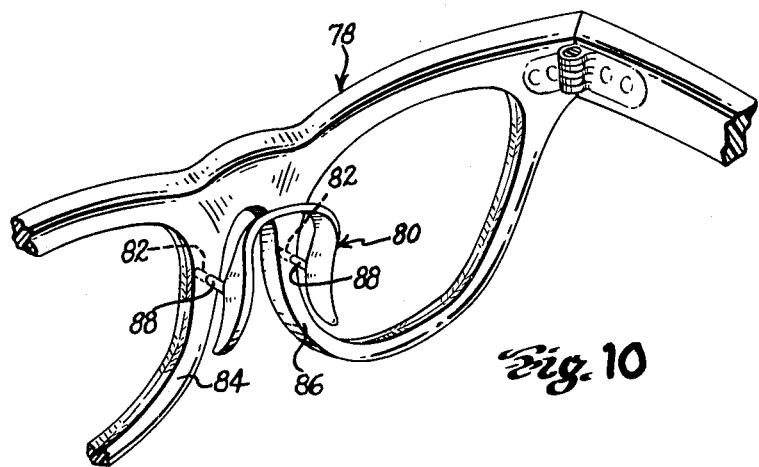

3,233,956
OPHTHALMIC MOUNTING WITH FLEXIBLY SUPPORTED NOSEPIECE
Armand De Angelis, Southbridge, Mass., assignor to American Optical Company, Southbridge, Mass., a voluntary association of Massachusetts
Filed Dec. 18, 1961, Ser. No. 159,871
3 Claims. (Cl. 351—130)

This invention relates to ophthalmic mountings and has particular reference to nosepieces therefor.

The frames of conventional ophthalmic mountings have, for some time, been designed to embody bridges which are disposed somewhat above and forwardly of the normal position of the bridge portion of the wearer's nose. These bridges are joined at opposite ends to the right and left eye lens supporting sections of the frames adjacent the respective brow areas thereof so as to be disposed generally in the horizontal plane of the frame endpieces which carry the frame supporting temples and which endpieces are also more commonly located high on the frame so as to be worn adjacent the brow of a wearer. Consequently, in order to properly support such an ophthalmic mounting upon the face of a wearer, something in addition to the bridge must usually be relied upon to engage and fit against the nose. In this respect, nose pads connected directly or indirectly to each of the lens supporting sections of the frame are provided and arranged to rest against opposite sides of the nose. These pads avoid sidewise motion of the frame on the face but, in order to prevent the frame from dropping, they must be tightly fitted against the nose and a substantial rearward pull on the frame must be provided by means of the temple parts thereof which usually hook over the ears or press tightly against the head adjacent the ears. The forces required to hold such frames in place produce discomfort on the wearer's ears and/or the adjacent area of the head and commonly cause considerable irritation and discomfort at the sides of the nose where the same is engaged by the pads.

It is well known that the most natural and comfortable way to support an ophthalmic mounting is to provide a saddle type of nosepiece which when properly fitted, will rest on the less sensitive bridge area of one's nose and, in this manner, support the bulk of the weight of the mounting without requiring more than a gentle engagement at the sides of the nose and/or no more than a light or gentle rearward pull on the temples to hold the mounting securely in place. For the most part, however, the use of saddle type nosepieces has been avoided by frame manufacturers in view of the fact that their effectiveness depends entirely upon proper fitting both at the bridge of the nose and at the sides thereof with the costly result of having to provide a multitude of different nosepiece sizes and contours to meet the facial requirements of the public.

In attempts to provide nosepieces which are more or less adjustable or self-conformable to different bridge sizes and shapes, the art has developed various intricate and expensive swivel or ball and socket type connections or the like for adjustably attaching flexible and/or rigid nosepieces to the nasal area of ophthalmic mountings. These arrangements usually embody strap-like nosepieces which engage substantially only the bridge area of the nose and rely entirely on this area of the nose to secure the ophthalmic mounting against lateral misalignment as well as downward slippage. Such nosepieces do not offer the secureness and comfort of the saddle type nosepiece which has side portions extending downwardly to engage the nose below the bridge area thereof while being simultaneously in engagement with the top or forward less sensitive area of the bridge portion of the nose to support the bulk of the weight of the ophthalmic mounting.

Many prior art nosepieces are alleged to be self-adjusting by reason of ball and socket or other similar connections with the frame proper but, in general, they are commercially undesirable particularly because of their intricate, costly and oftentimes ungainly nature.

The present invention provides an improved self-adjusting nosepiece construction which is readily adaptable to all types of ophthalmic mountings or goggles or the like and which is uniquely simple, inexpensive to manufacture and provides optimum comfort and secureness of fit upon the nose of a wearer.

Accordingly, a general object of the invention is to provide improvements in ophthalmic mountings or the like more particularly with regard to the nosepieces thereof.

Another object is to provide a saddle type nosepiece for an ophthalmic mounting or the like which is automatically self-adjustable to optimum positions for comfort and secureness of fit when in use.

Another object is to provide a nosepiece of the above character having a relatively rigid main body section and novel flexible pin members thereon serving dually for attaching said nosepiece to an ophthalmic mounting or article intended to receive the same and for providing said above-mentioned self-adjusting feature thereof.

Another object is to provide a nosepiece structure of the above character whose body section and flexible pin members may be formed simply and economically by conventional moulding, casting or machining techniques together as a unitary structure or separately to be thereafter assembled.

Other objects and advantages of the invention will become apparent from the following description when taken in conjunction with the accompanying drawings in which:

FIG. 1 is a front elevational view of an ophthalmic mounting showing one embodiment of the invention;

FIG. 2 is an enlarged fragmentary rear perspective view of the nasal section of the mounting shown in FIG. 1;

FIG. 3 is an enlarged cross-sectional view taken approximately on line 3—3 of FIG. 1 looking in the direction indicated by the arrows;

FIG. 4 is a view similar to FIG. 3 illustrating a modification of the invention;

FIGS. 5 and 6 are partially cross-sectioned fragmentary views of further modifications of the invention;

FIGS. 7 and 8 are perspective illustrations of flexible elements used in the construction of a nosepiece in accordance with one aspect of the invention;

FIG. 9 is an enlarged fragmentary rear perspective view of another modification of the invention; and FIG. 10 is an enlarged rear perspective view of an ophthalmic mounting of different character than that shown heretofore which is fittted with a nosepiece of the type relating to this invention.

Referring more particularly to the drawings wherein like characters of reference designate like parts throughout the several views, there is shown in FIG. 1 an ophthalmic mounting 12 which embodies a frame front having a pair of right and left eye lens supporting sections 14 and 16 respectively joined together by a structural supporting bridge 18. The sections 16 and 18 each embody a grooved eyewire 20 or 22 which in the usual manner of construction surrounds the edge of a lens 24 or 26 and is clamped in place thereon. The eyewires 20 and 22 which support the respective lenses 24 and 26 further, in this instance, provide means to which the opposing ends 28 and 30 of the bridge 18, are attached such as by solder connections to thereby make up the frame front of the ophthalmic mounting 12. Further to the construction of the frame front, there is added a pair of brow sections 32 and 34 which fit over the respective eyewires 20 and 22 and extend from the nasal areas thereof so as to terminate at the temporal sides of the mounting 12. Adjacent their termination, the brow sections 32 and 34 each carry a temple 36 and 38 respectively which is customarily pivotally connected thereto and extends rearwardly of the mounting 12 for purposes of engaging the head of a wearer by extending over and behind or adjacent the area of the ears. In the present type of construction, the eyewires 20 and 22 and bridge 18 are usually formed of metal while the brow sections 32 and 34 and the temples 36 and 38 may be either plastic or metal or combinations of each.

As it can be seen in FIG. 1 and possibly more clearly in FIG. 3 wherein the profile of one type of nose is illustrated by dot-dash outline 40 and the profile of another type of nose is illustrated by the dotted outline 42, the bridge 18 is disposed somewhat above the bridge area of the noses 40 and 42 and considerably forwardly thereof when the mounting is in a position of use. Thus, it can be seen that the bridge 18 functions only as a connecting link between the lens supporting sections 14 and 16 of the mounting 12. In order to rest the mounting upon the nose 40 or 42 in a comfortable and secure fashion in accordance with this invention, a saddle-type nosepiece 44 is provided. The nosepiece 44 embodies a preformed relatively rigid body section 46 with an upper arched portion 48 which is contoured to rest comfortably against the forward bridge area of the nose. Depending from the arched portion 48 at opposite sides thereof are side portions 50 which are somewhat divergent as they extend downwardly and are contoured to fit comfortably against the respective opposite sides of the nose.

In order to render the nosepiece 44 universally adaptable to the majority of nose shapes so that engagement of the forward area of the bridge of a nose will be made by the arched portion 48 simultaneously with engagement of the sides of the nose at some point along the respective side portions 50, the nosepiece 44 is supported upon the ophthalmic mounting 12 so as to be free to tilt forwardly or rearwardly as needed. This tilting compensates for the different thicknesses of noses wherein for thinner noses the lower ends of side portions 50 will move back farther than will be the case for thicker or broader noses.

In order to accomplish this end, the nosepiece is pivotally or tiltably mounted by means of forwardly extending flexible pin-members 52 provided on the side portions 50. As shown in FIGS. 2 and 3, these pin members 52 are formed integral with the body section 46 of the nosepiece 44. That is, the pin members and the body portion 46 are a one-piece unit.

The nosepiece 44 is carried upon the ophthalmic mounting 12 by means of relatively rigid but adjustable guard arms 54 preferably formed of metal and having one of each of their ends soldered to the eyewires 20 and 22. The guard arms are provided with socket members 56 at their terminal ends into which the pin members 52 are extended and secured. Securement of the pin members 52 in the socket members 56 may be made by providing a tight press fit as illustrated throughout the drawings or a suitable cement, epoxy or other commercial adhesive material might be used.

As it can be seen in FIG. 3, the relatively thin cross-sections of the pin members 52 which are exposed between the socket members 56 and the body portion of the nosepiece 44 allow the nosepiece 44 to tilt freely to whatever position is required for proper seating against the nose. That is, as illustrated in FIG. 3, a nose such as 42 having a relatively flat or more horizontally disposed bridge area will require the nosepiece 44 to tilt approximately to a position such as shown by the dotted outline 44a while a nose such as 40 would require the nosepiece 44 to assume the position of the full line showing. It should, of course, be understood that the above nose shapes are given for purposes of illustration only and the thickness of the nose will also be a controlling factor in the degree of tilt required to make the abovementioned three-area contact with the nose, wherein the arched portion 48 of the nosepiece 44 will engage the bridge area of the nose and the side portions 50 will simultaneously engage the sides of the nose.

With a supporting structure such as is shown in FIGS. 1–3, the nosepiece 44 as a whole, may be adjusted forward and back or up and down relative to the mounting structure by bending of the guard arms 54. This adjustment is used to initially set the nosepiece relative to the frame front so that when the ophthalmic mounting is worn, the eyes will be approximately coaxial with the optical centers of the lenses 24 and 26.

The one-piece structure of the nosepiece 44 is preferably moulded or cast of a plastic material which, when in relatively large masses such as the body portion 46 of the nosepiece 44 is relatively rigid while, when in thin sections such as the pin members 52, it is flexible, resistant to breakage with an inherent long lasting ability to return to its initial shape after distortion and will allow the nosepiece to tilt freely. Most commercial thermoplastic materials are, to some extent so characterized and, in general, can be used in making the nosepiece 44. However, some thermoplastic materials are more dependable and show less fatigue in flexing than others and, for this reason, a preferred plastic for the one-piece construction of the nosepiece 44 would be polypropylene or other select plastics such as nylon or Teflon all of which have similar characteristics of being readily distortable when in relatively thin sections and resistant to breakage after prolonged use with an inherent ability to return to its initial shape after distortion, impervious to perspiration and resistant to corrosion. It is pointed out that while the pin members 52 are required to flex, they actually are flexed primarily only in one direction (vertically) and the extent of their flexure for proper fitting of the nosepiece is never very great and actually not sufficient to be beyond the elastic limit of most all commercial plastics such as butyrates, acetates or polycarbonates when of such cross-sectional sizes as the pin members 52. For example, the pin members 52 would normally be no larger than approximately .040 of an inch in diameter and might be as small as approximately .010 of an inch in the area thereof where they are to flex. Furthermore, these pin members may be circular in cross-section or of any rectilinear cross-sectional shape and the sockets which receive the same would naturally have their receiving openings contoured to substantially match the size and shape of the pin members to be received thereby.

From the above, it can be seen that a simple and inexpensive self-adjusting nosepiece has been provided which, without intricate or ungainly pivot members is adapted, by reason of its self-adjusting feature, to provide comfortable and secure fitting upon the majority of all noses. For extreme cases where exceptionally wide or exceptionally narrow noses are encountered, the nosepieces may be provided in extra wide or extra narrow sizes. That is, the space between the depending side parts 50 may be constructed greater or less than the average width of the most commonly encountered nose shapes. It is pointed out, however, that a nosepiece having a width A (FIG. 1) of approximately 15 mm. will, because of the tilting feature of the present invention, be universally adjustable to properly fit the great majority, if not all nose shapes which will be encountered. The above-described three-area contact in fitting wherein the arched portion 48 engages the top of the bridge of a nose and the side portions 50 and 52 simultaneously engage the sides of the nose somewhere below the arched portion 48, is automatically obtained when the nosepiece is placed against the nose. By making contact with the top or forward area of the bridge of one's nose which is the less sensitive area thereof, the bulk of the weight of the ophthalmic mounting is supported thereby and only a slight holding force or pull on the temples of the ophthalmic mounting is required to steady the mounting upon the wearer's face. Thus, no appreciable pressure against the more sensitive side areas of the nose is experienced with the result of a comfortable and secure fit.

The structure of the nosepiece 44 might be modified as shown in FIGS. 4–6 in the event that it might not be possible to obtain a particular color or desired clearness in the particular plastics required to give sufficient rigidity to the body portion 46 with proper flexibility in the pin members 52.

In this aspect of the invention (see FIG. 4) the body portion 46' of the nosepiece 44' is formed of one material while the flexible pin members 52' are formed of another material and subsequently assembled with the body portion 46'. Thus, the body portion 46' may be formed of any desired rigid or semi-rigid material such as, for example, a clear or colored plastic material or metal or metallic alloy. A clear plastic such as propionate or methyl methacrylate might be used or a lightweight metal such as aluminum or the like. Once having formed the body portion 46' of the nosepiece 44' separately by moulding, casting or other techniques, it is provided with openings 58 extending into the depending side portions 50' thereof for receiving the pin members 52'. The pin members 52' which are required to be flexible are formed separately preferably of a plastic such as polypropylene, nylon or Teflon or any of the more durable materials mentioned hereinabove and are press-fitted and/or cemented in the openings 58. It should be understood that the nosepiece 44' might have its body portion 46' and pin members 52' formed of the same material if desired.

Application of the nosepiece 44' thus formed to an ophthalmic mounting such as 12 is made by placing the opposite ends of the pin members 52' in the respective sockets 56 of the mounting 12 as described hereinabove with relation to the nosepiece 44.

In FIG. 5 a modified flexible pin member 60 is illustrated as being used to make the flexible connection between the body portion 46' of the nosepiece 44' and a socket 56 of the ophthalmic mounting 12. In this instance, the pin member 60 is provided with shoulders 62 and 64 which abut the respective socket 56 and body part 46' when the assembly of the nosepiece 44' to the ophthalmic mounting is made.

If it is desired to lend more flexibility to the pin member 60, its midsection 66 may be notched at 68 as shown in FIGS. 6 and 7. The notches 68 would preferably be made only across the top and bottom of the midsection 66 in directions normal to the direction in which the pin member 60 is intended to flex (see FIGS. 6 and 7). The cross-sectional area of the pin member 60, for all practical purposes, should not be reduced by the notches 68 in any one direction to less than approximately .010 of an inch.

It is also pointed out that the pin members 52' (FIG. 4) or 52 (FIGS. 2 and 3) may also be notched as illustrated in FIG. 8 for added flexibility if desired. It will be noted that the pin 70 (FIG. 8), which is given by way of example to illustrate this feature, is notched at 72 in a manner similar to the pin 60 described hereinabove.

In the event that it is desired to dispense with the guard arm construction of the ophthalmic mounting 12 shown and described hereinabove, the guard arms 54 may each be replaced by a tubular socket 74 such as is illustrated in FIG. 10. The tubular sockets are secured endwise by a solder connection to the rear of each of the eyewires 20 and 22 and the flexible pins of the nosepiece to be attached to the mounting 12 are entered into the tubular sockets 74 and secured by a press fit and/or cement or the like therein in a manner analogous to the assembly which is made with the guard arm sockets 56. For purposes of illustration a nosepiece 76 is shown in position prior to assembly with the mounting 12 (FIG. 7).

As pointed out hereinabove, the nosepieces of the invention are adaptable to the frame parts of all types of ophthalmic mountings or goggles or the like and to further illustrate this utility, an all plastic type of spectacle frame 78 is shown in FIG. 10 as embodying a nosepiece 80 of the type relating to this invention. In such a spectacle frame, the nosepiece 80 is mounted thereon simply by drilling or otherwise providing openings 82 (shown by dotted outline) in the rear nasal area of the eyewire sections 84 and 86 of the spectacle frame 78. The flexible pivot pins 88 of the nosepiece are inserted into the openings 82 and cemented or otherwise secured therein such as by the use of a solvent in the conventional manner of joining certain plastics. The lengths of the flexible pivot pins 88 and/or the distances to which they are inserted into the openings 82 are controlled to provide exposed areas thereof between the frame 78 and body portion of the nosepiece 80 which are of sufficient length in accordance with the cross-sectional area of the pins and nature of the material thereof to provide the desired degree of flexibility. As an example, pins having a minimum cross-sectional dimension of approximately .040 of an inch and formed of polypropylene should have an exposed area of from approximately .050 of an inch to .070 of an inch between the body portion of the nosepiece and their connection to the spectacle frame. The above example would also be applicable to the exposed areas of the pin members 52, 52' or 60 when assembled as illustrated. These examples should not, in any way, be limiting since considerable variation from the figures given might be appropriate in some instances.

From the foregoing, it can be seen that simple and efficient means has been provided for accomplishing all of the objects and advantages of the invention. Nevertheless it should be apparent that many changes in the details of construction may be made without departing from the spirit of the invention as expressed in the accompanying claims and the invention is not to be limited to the exact matters shown and described as only preferred matters have been given by way of illustration.

Having described my invention, I claim:

1. A self adjusting nosepiece adapted to serve as a support for an ophthalmic mounting having a pair of spaced lens carrying sections interconnected by a bridge, said nosepiece being of relatively rigid construction having an arched upper nose engaging portion for engaging the bridge area of the nose of a wearer and spaced side nose engaging portions depending from said upper portion for simultaneously engaging respective opposite sides of said nose when in use, a normally substantially straight pin extending forwardly from each side portion of said nosepiece and terminating in an end portion adapted to be connected to a respective one of said lens carrying sections of said ophthalmic mounting, said pins being formed of flexible material having characteristics such as to tend to return to its initial set when said pins are flexed and released and, when released, being adapted to support said nosepiece substantially without flexing so as to retain said nosepiece in a proper predetermined positional relationship with said lens carrying sections yet being free to tilt by flexing of said pins for self adjusting proper fitting relationship with the nose of the wearer when the mounting is placed upon the face of said wearer.

2. The nosepiece of claim 1 in which said pins are each notched on at least one side thereof to flex primarily in a vertical direction relative to said ophthalmic mounting when said nosepiece is in use thereon.

3. A frame front for an ophthalmic mounting comprising a pair of lens supporting members, a bridge extending between said members and interconnected therewith, a unitary nose bearing member having an arched upper portion for engaging the bridge area of the nose of a wearer and spaced depending side portions for engaging respective opposite sides of the nose of a wearer, a flexible pin member extending forwardly from each side portion of said nose bearing member and terminating in an end portion connected with said frame front on the sides thereof adjacent the opposite sides of the nose of the wearer, said flexible pin members being formed of plastic material having characteristics such as to tend to return to its initial set when said pin members are flexed and released and being adapted to support said nose bearing member in a predetermined positional relation with said lens supporting members so as to initially have surface contact with and yet be free to tilt for proper fitting relation with the nose of the wearer when the mounting is placed on the face of said wearer.

References Cited by the Examiner
UNITED STATES PATENTS

| | | | |
|---|---|---|---|
| 434,832 | 8/1890 | Martin | 88—50 X |
| 588,723 | 8/1897 | Ward | 88—50 |
| 1,742,163 | 12/1929 | Levy | 88—49 |
| 1,820,627 | 8/1931 | Nerney | 88—43 |
| 1,910,456 | 5/1933 | Baker | 88—41 |
| 2,354,603 | 7/1944 | Malcom | 88—49 |
| 2,459,051 | 1/1949 | Smith | 88—51 |
| 2,547,467 | 4/1951 | Hurst | 88—49 |
| 2,640,391 | 6/1953 | Moseley | 88—55 |
| 2,654,290 | 10/1953 | Hirschman | 88—43 |
| 3,019,486 | 2/1962 | Stinson. | |

FOREIGN PATENTS

| | | |
|---|---|---|
| 461,401 | 2/1937 | Great Britain. |
| 471,042 | 8/1937 | Great Britain. |
| 683,614 | 12/1952 | Great Britain. |

DAVID H. RUBIN, *Primary Examiner.*

WILLIAM MISIEK, JEWELL H. PEDERSEN,
*Examiners.*